US010324218B2

(12) United States Patent
Nichols et al.

(10) Patent No.: US 10,324,218 B2
(45) Date of Patent: Jun. 18, 2019

(54) ELECTROMAGNETIC ASSESSMENT OF MULTIPLE CONDUCTIVE TUBULARS

(71) Applicant: Schlumberger Technology Corporation, Sugar land, TX (US)

(72) Inventors: Edward Nichols, Berkeley, CA (US); James J. Kohring, Anchorage, AK (US); Rafael Vinit, Clamart (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 120 days.

(21) Appl. No.: 14/718,020

(22) Filed: May 20, 2015

(65) Prior Publication Data

US 2015/0338541 A1 Nov. 26, 2015

(30) Foreign Application Priority Data

May 26, 2014 (EP) .................................... 14290154

(51) Int. Cl.
*G01V 3/26* (2006.01)
*G01B 7/06* (2006.01)
(Continued)

(52) U.S. Cl.
CPC ................ *G01V 3/26* (2013.01); *E21B 41/02* (2013.01); *E21B 47/082* (2013.01); *G01B 7/06* (2013.01);
(Continued)

(58) Field of Classification Search
CPC ... G01V 3/26; G01V 3/34; G01V 1/40; G01B 7/06; G01B 7/10; E21B 41/02; E21B 47/082
See application file for complete search history.

(56) References Cited

U.S. PATENT DOCUMENTS

| 2,111,210 A | 3/1938 | Ebel |
| 2,573,799 A | 11/1951 | MacLean |

(Continued)

FOREIGN PATENT DOCUMENTS

| DE | 10109568 A1 * | 7/2002 | ............ G01B 7/105 |
| EP | 1795920 A1 | 6/2007 | |

(Continued)

OTHER PUBLICATIONS

English Translation of DE 10109568 A1.*

(Continued)

*Primary Examiner* — Patrick Assouad
*Assistant Examiner* — Haidong Zhang
(74) *Attorney, Agent, or Firm* — Michael Dae

(57) ABSTRACT

Systems, apparatuses, and methods for measuring material thickness of multiple tubulars by placing a logging tool in a well with multiple conductive tubulars and generating an electromagnetic field that interacts with the tubulars. A logging tool obtains the measurements using one or more receivers. A monitoring system or the logging tool applies the measurements to a mathematical model that considers at least a transition zone and one or both of a near field zone and a remote field zone of the electromagnetic field that interacts with the multiple conductive tubulars. Furthermore, the monitoring system or the logging tool may ascertain a thickness of the one or more conductive tubulars using the mathematical model.

15 Claims, 13 Drawing Sheets

(51) Int. Cl.
*G01V 1/40* (2006.01)
*G01V 3/34* (2006.01)
*E21B 47/08* (2012.01)
*E21B 41/02* (2006.01)

(52) U.S. Cl.
CPC ............... *G01B 7/10* (2013.01); *G01V 1/40* (2013.01); *G01V 3/34* (2013.01)

(56) References Cited

U.S. PATENT DOCUMENTS

| | | | |
|---|---|---|---|
| 2,992,390 | A | 7/1961 | De Witte |
| 3,225,293 | A | 12/1965 | Wood et al. |
| 4,292,588 | A | 9/1981 | Smith |
| 4,292,589 | A | 9/1981 | Bonner |
| 4,292,599 | A | 9/1981 | Bonner |
| 5,491,668 | A * | 2/1996 | Priest ................ G01B 17/02 181/105 |
| 6,457,528 | B1 * | 10/2002 | Staudt ................ E21B 17/08 166/335 |
| 7,960,969 | B2 | 6/2011 | Mouget et al. |
| 9,746,309 | B2 | 8/2017 | Nichols |
| 2013/0193953 | A1 * | 8/2013 | Yarbro ................ E21B 47/082 324/76.77 |
| 2015/0219601 | A1 * | 8/2015 | Davydov ............. E21B 47/00 324/229 |

FOREIGN PATENT DOCUMENTS

| | | |
|---|---|---|
| EP | 2270420 A1 | 1/2011 |
| JP | 2001289824 A | 10/2001 |
| WO | 2012/051136 | 4/2012 |

OTHER PUBLICATIONS

T.M. Brill, et al., "Quantitative Corrosion Assessment with an EM Casing Inspection Tool," SPE/DGS Saudi Arabia Section Technical Symposium and Exnibition held in Al-Khobar, Saudi Arabia, May, 15-18, 2011.

Extended European Search Report issued in the related EP Application 14290154.5, dated Nov. 6, 2014 (6 pages).

Teitsma, A, and Maupin, J. Reduced Mandated Inspection by Remote Field, Eddy Current Inspection of Unpiggable Pipelines,Gas technology Institute Technical final report, Oct. 2006, DE-FC26-04NT4226 (https://www.osti.gov/scitech/servlets/purl/915813) (66 pages).

Hansen, The eddy current inspection method, Insight, vol. 46, No. 8, Aug. 2004 (4 pages).

* cited by examiner

ELECTROMAGNETIC ASSESSMENT OF MULTIPLE CONDUCTIVE TUBULARS

BACKGROUND

The present disclosure relates to eddy current corrosion assessment using at least a far field, a near field, or a transition field from a downhole tool.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions.

In well logging via electromagnetic field testing, such as remote field eddy current (RFEC), a field-testing probe is slid within an interior diameter of a conductive tubular. A transmitter of the field-testing probe creates an electromagnetic field that interacts with the tubular. The electromagnetic field varies depending on thickness and/or corrosion in the tubular. Receivers may detect these variations in the electromagnetic field, generally in a far field zone of the detectable electromagnetic field. Based on these detected variations, the thickness and/or corrosion of the tubular may be determined. However, generally, RFEC receivers just reflect changes to overall thickness of the tubulars rather than individual tubulars.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In a first embodiment, a method for determining thickness of multiple nested tubulars includes placing a logging tool in a well with multiple conductive tubulars. The method also includes generating an electromagnetic field using a transmitter of the logging tool. The electromagnetic field interacts with the multiple conductive tubulars. Moreover, the method includes obtaining measurements of the electromagnetic field from one or more receivers of the logging tool. Additionally, the method includes applying the measurements to a mathematical model that considers at least a transition zone and one or both of a near field zone and a remote field zone of the electromagnetic field that interacts with the multiple conductive tubular. Furthermore, the method includes ascertaining a thickness of at least one or more of the conductive tubulars using the mathematical model.

Another embodiment includes a system for determining characteristics of multiple nested conductive tubulars. The system includes a logging tool configured to be placed in a well having the multiple nested conductive tubulars. The logging tool may include a transmitter which generates an electromagnetic field and a receiver which acquires one or more electromagnetic measurements from a transition zone of the electromagnetic field. The system may also include processing circuitry for determining a thickness of the fewer than a total of the multiple nested tubulars, based the acquired electromagnetic measurements.

In another embodiment, a method for determining thickness of multiple nested conductive tubulars includes placing a logging tool in a well having the multiple nested conductive tubulars. The method also includes acquiring one or more electromagnetic measurements by generating an electromagnetic field using a transmitter of the logging tool and detecting the electromagnetic measurements using a receiver of the logging tool that detects the electromagnetic measurements in a transition zone of the electromagnetic field. The electromagnetic measurements are indicative of a thickness of fewer than the total of the multiple nested tubulars using the logging tool. The method also includes determining metal loss in the fewer than the total of multiple nested tubulars using the one or more electromagnetic measurements.

In another embodiment, a method for determining thickness of multiple nested tubulars includes using a first casing thickness measurement of a first modality, determining a thickness of an innermost tubular of the multiple nested tubulars. The method also includes using a second casing thickness measurement of a second modality, determining an overall thickness of the multiple nested tubulars. Furthermore, the method includes using the first and second casing thicknesses, determining a thickness of a subset of the multiple nested tubulars.

Various refinements of the features noted above may be made in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended just to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments of the present disclosure will be described below. These described embodiments are just examples of the presently disclosed techniques. Additionally, in an effort to provide a concise description of these embodiments, features of an actual implementation may not be described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would still be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Embodiments of the present disclosure relate to devices and methods for measuring metal thicknesses in nested tubulars of a well (e.g., downwell tubulars such as casings) using a measurement probe with a transmitter and at least one receiver determining thickness of a subset of the tubulars and other receivers determining overall thickness. In some embodiments, the electromagnetic property of one or more of the individual tubulars may be the measurement objective, or the amount of off-centering of one or more of the tubulars. In some embodiments, the receivers determining thickness of the subset of the tubulars includes receivers located in a transition zone of the field generated by the transmitter rather than the total number of receivers being in the far field. These receivers may detect thickness of one or more of the innermost tubulars and have small or no response to other tubulars farther from the interior. Furthermore, the data from the transition zone receivers and the far field receivers may be combined to determine thicknesses of individual tubulars or groups of tubulars or determine tool eccentering or tilt. In some embodiments, the receivers determining thickness of just some of the tubulars includes a different technology than the technology used to determine overall thickness of the tubulars.

Figure 1:
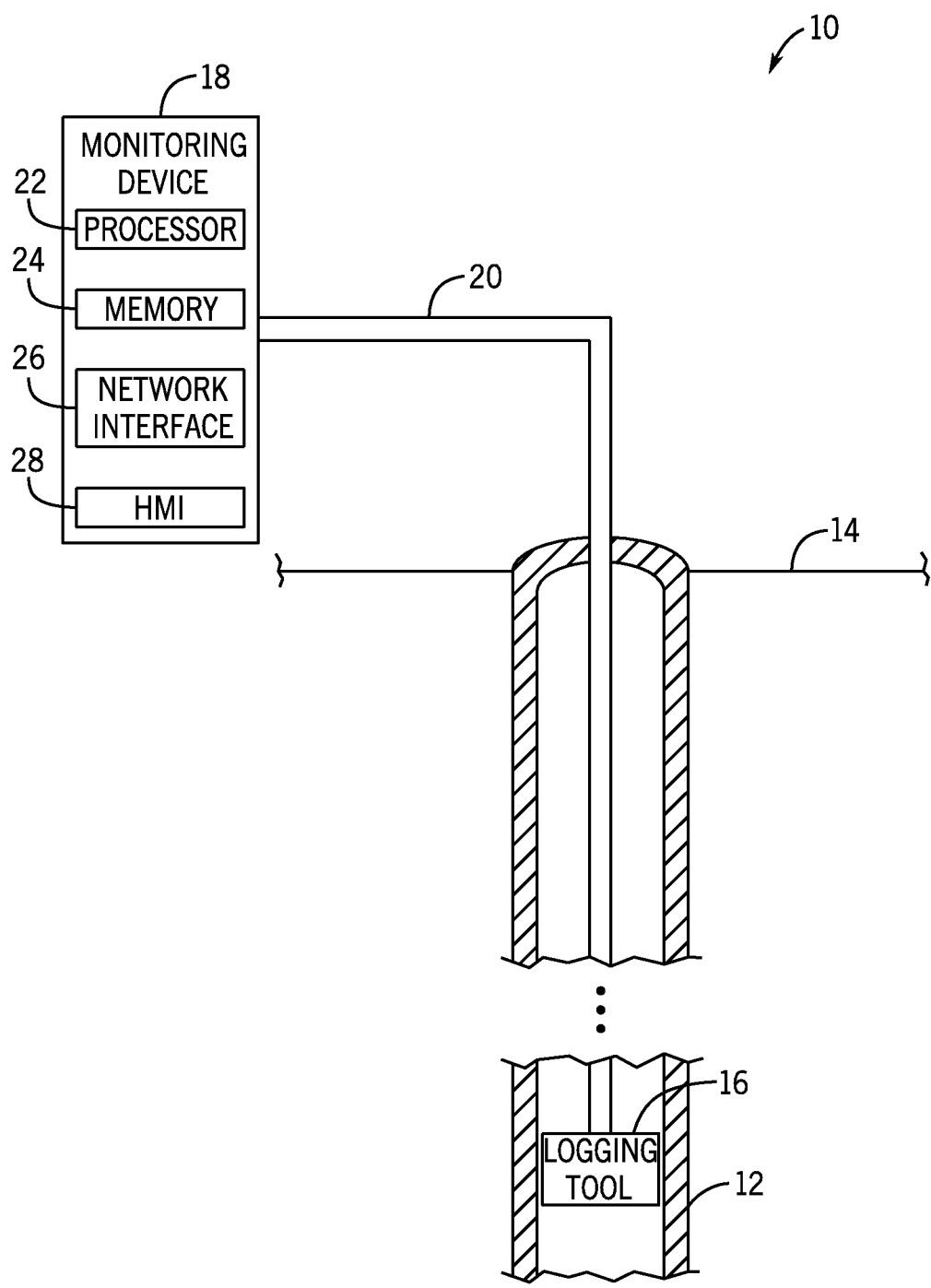
FIG. 1 is a schematic block diagram of a field testing probe used to measure tubular thicknesses, in accordance with an embodiment.

With the foregoing in mind, FIG. 1 is a block diagram depicting a field testing (FT) system 10 that may be used to determine thickness (e.g., 0.1 inches to 4 inches) and/or defects due to corrosion of one or more tubulars 12. For example, an outer surface of the one or more tubulars 12 may be corroded by contact with earth and/or fluids. In some embodiments, the tubulars 12 may be measured while within the earth 14, water, and/or air. The FT system 10 includes a logging tool 16 that may be lowered into the one or more tubulars 12. As will be discussed further below, the logging tool 16 generates a time-varying magnetic field signal that interacts with the conductive tubulars 12 having magnetic properties that are affected by alternating electromagnetic current. The logging tool 16 may be energized from the surface or have its own internal power used to emit the time varying magnetic field signal. The magnetic field signal travels outwards from the logging tool 16 through and along the tubulars 12. The magnetic field signal from the logging tool 16 may therefore generate eddy currents in the tubulars 12 that produce corresponding returning magnetic field signals. As will be discussed below, the logging tool 16 may detect the returning magnetic field signals. In areas of metal loss in the tubulars 12, the returning magnetic field signal may arrive at the logging tool 16 with less phase change and/or greater signal strength (e.g., higher amplitude) than otherwise, owing to the reduced path through the one or more tubulars 12.

The logging tool 16 may be coupled to a monitoring device 18 via a communication link 20 that maintains connection between the logging tool 16 and the monitoring device 18 as the logging tool 16 traverses the length of the one or more tubulars 12. The monitoring device 18 may include a processor 22, a memory 24, a network interface 26, a human machine interface (HMI) 28, and/or other electronic components suitable for monitoring and/or analyzing measurements of the logging tool 16 and relaying that information to an appropriate destination such an end user and/or log.

In the monitoring device 18, the processor(s) 22 and/or other data processing circuitry may be operably coupled with the memory 24 to execute instructions. Such programs or instructions executed by the processor(s) 22 may be stored in any suitable article of manufacture that includes one or more tangible, computer-readable media at least collectively storing the instructions or routines, such as the memory 24. The memory 24 may include any suitable articles of manufacture for storing data and executable instructions, such as RAM, ROM, rewritable flash memory, hard drives, and optical discs. Also, programs (e.g., an operating system) encoded on such a computer program product may also include instructions that may be executed by the processor(s) 22. In some embodiments, the logging tool 16 may include one or more processors that perform at least a portion of the below-described processing.

The network interface 26 may include circuitry for communicating over one more networks. For example, the network interface 26 may include interfaces for a personal area network (PAN), such as a Bluetooth network, for a local area network (LAN), such as an 802.11x Wi-Fi network, and/or for a wide area network (WAN), such as a 3G, 4G, or LTE cellular network.

The HMI 28 may include one or more input and/or output devices for enabling communication between the processor 22, the memory 24, the network interface 26, and one or more users. In some embodiments, the HMI 28 may include one or more input devices and one or more output devices. For example, in certain embodiments, the HMI 28 may include a display and/or a keyboard, a mouse, a touch pad, or other input devices suitable for receiving inputs from a user. In some embodiments, the HMI 28 may include a touch-screen liquid crystal display (LCD), for example, which may enable users to interact with a user interface of the monitoring device 18.

Figure 2:
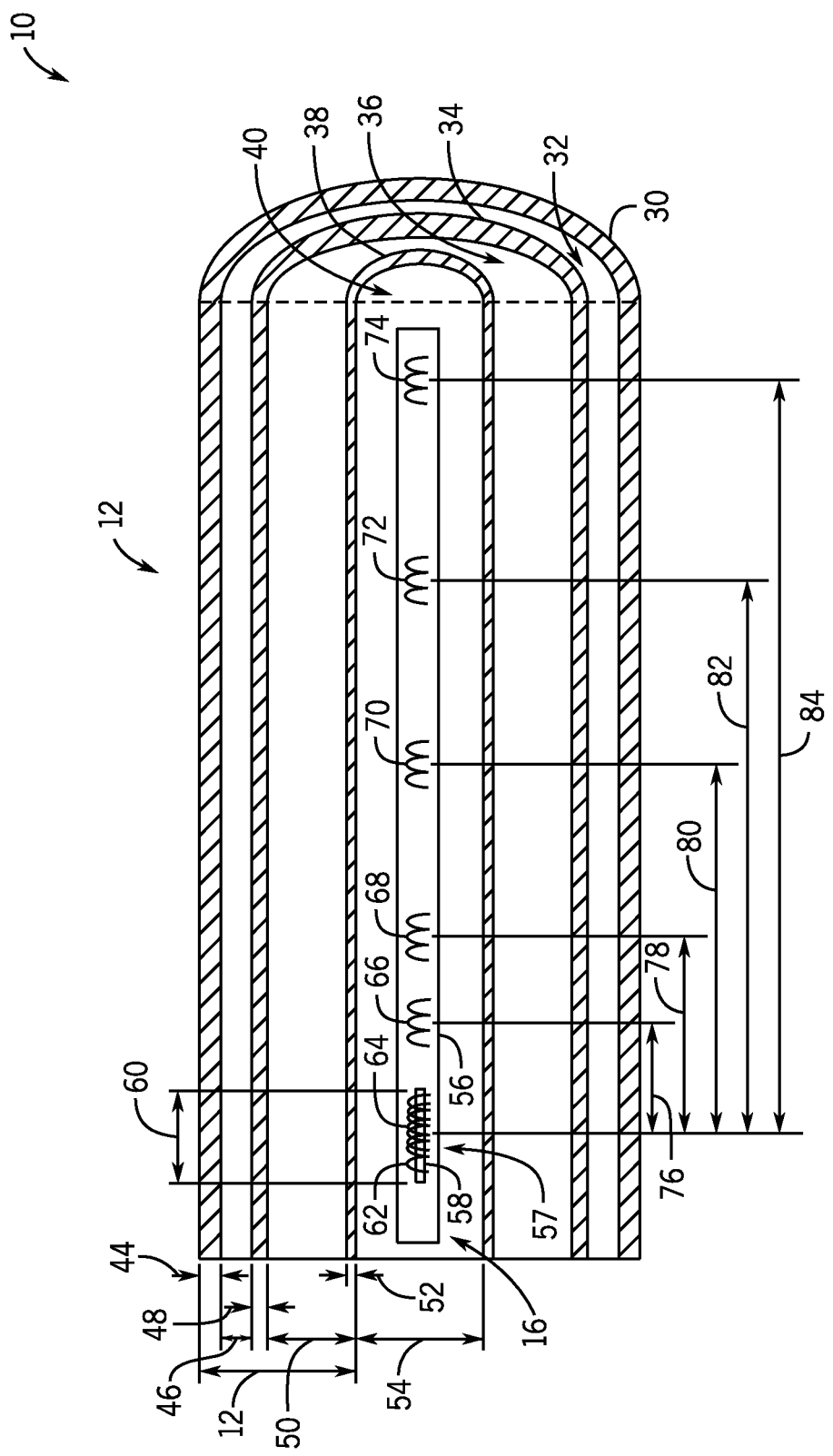
FIG. 2 is a cross-sectional view of the field testing probe of FIG. 1 located within multiple tubulars, in accordance with an embodiment.

FIG. 2 depicts a cross-sectional view of FT system 10 located inside the one or more tubulars 12. The illustrated embodiment of the tubular 12 includes an outer tubular thickness 44, an outer spacing 46, a middle tubular thickness 48, a middle spacing 50, and an inner tubular thickness 52. Although the illustrated embodiment illustrates three tubulars with a total thickness 42 including an outer tubular 44, a middle tubular 48, and an inner tubular 52, other embodiments may include 1, 2, 4, 5, or more tubulars. The total thickness of the tubulars includes the sum of the thicknesses of tubular thicknesses 44, 48, and 52. For example, in some embodiments, the tubulars may include a production tubing, an intermediate casing, a surface casing, and a conductor casing. In some embodiments, one or more of the spacings may include structural but substantially nonconductive material, such as cement. In other words, the total thickness 42 is the sum of the thickness of the outer tubular 44, the middle tubular 48, and the inner tubular 52. In some embodiments, the tubulars 12 may include at least one other tubular that is non-concentric with the inner tubular 54. The logging tool 16 traverses the tubulars 12 within an inner diameter 54 of the tubulars 12 located at the center of the tubulars 12. In certain embodiments, the logging tool 16 includes a housing 56 that encloses the logging tool 16 components. In some embodiments, the housing 56 may be a pressure-resistant housing. Within the housing 56, the logging tool 16 includes a transmitter 57 that includes a transmitter core 58 having a length 60. In some embodiments, two windings may be located around the transmitter core 58: a transmission winding 62 and a monitor winding 64. In some embodiments, the transmitter core 58 may be wound around by a single transmission winding 62.

The logging tool 16 also may include one or more receivers (e.g., 66, 68, 70, 72, and/or 74). In the illustrated embodiment, the receivers 66, 68, 70, 72, and 74 are each located in a line along the logging tool 16. Each receiver 66, 68, 70, 72, and 74 is located some distance away from the transmitter 57. For example, the receiver 66 may be located a distance 76 from the transmitter 57, the receiver 68 may be located a distance 78 from the transmitter 57, the receiver 70 may be located a distance 80, the receiver 72 may located a distance 82 from the transmitter 57, and the receiver 74 may be located a distance 84 from the transmitter 57. In certain embodiments, each distance 78, 80, 82, and 84 may be a multiple of the distance 76. For example, the distance 78 may be twice the distance 76, and distances 80, 82, and 84 may respectively be three, four, and five times the distance 78. Furthermore, in some embodiments, the distance 76 may be less than, greater than, or equal to the length 60. In certain embodiments, the receivers 66, 68, 70, 72, or 74 may be located at distances of between 7 inches or less to 90 inches or more from the transmitter 57. The receivers 66, 68, 70, 72, or 74 may detect the strength and/or phase of the returning magnetic field from the tubular 12. These detected values may then be used to determine a thickness of the tubular(s) 12 using any suitable FT analyses. Although the receivers 66, 68, 70, 72, or 74 are illustrated as axially located receivers, in some embodiments, at least some of the receivers 66, 68, 70, 72, and 74 may be located azimuthally adjacent to an inner wall of the tubular. In certain embodiments, at least some of the receivers 66, 68, 70, 72, and 74 may have a radial sensitivity (e.g., saddle coils, Hall-effect sensor, or giant magneto-resistive sensor) that may detect defects or transverse cracks in the tubular 12. There may be embodiments having multiple transmitter configurations where the windings are transverse or obliques as in a saddle coil arrangement which couple to these receiver or additional receiver windings.

Figure 3:
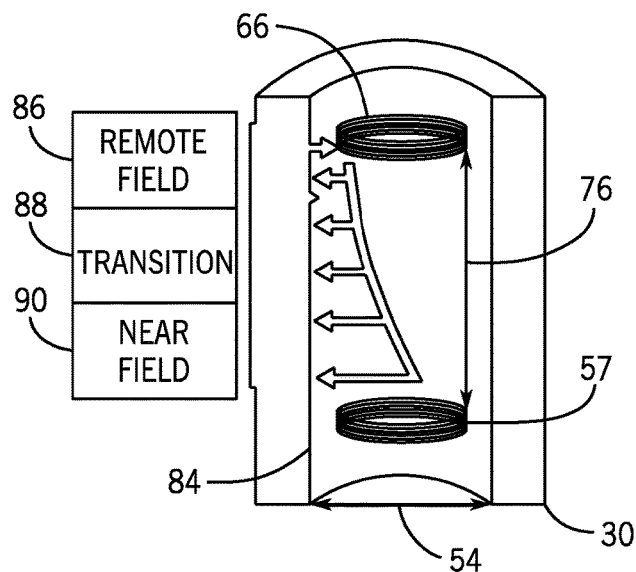
FIG. 3 is a cross-sectional view of an inner tubular depicting zone areas of a field emitted by the transmitter of the field testing probe of FIG. 1, in accordance with an embodiment.

FIG. 3 is a cross-sectional view of the inner tubular 30 depicting zone areas of a magnetic field 84 emitted by the transmitter of the field testing probe 16. In the illustrated embodiment, the transmitter 57 is spaced from the receiver 66 at a distance sufficient to place the receiver 66 in the remote field zone 86 of the field. For example, the receiver 66 may be placed at a distance 76 over two or three times the length of a total outside diameter (OD) of the tubulars 30, 34, and 38. However, in some embodiments, even if the distance 76 is three times the OD, the receiver 66 may be located in the transition zone 88 or the near field zone 90 of the field 84. For example, higher frequencies and large gaps in the sizes of the multiple casings made the transition zone behavior regime extend even farther from the transmitter, and a far field zone assumption may not be valid even when the distance between the transmitter and receiver is three times greater than the OD.

Figure 4:
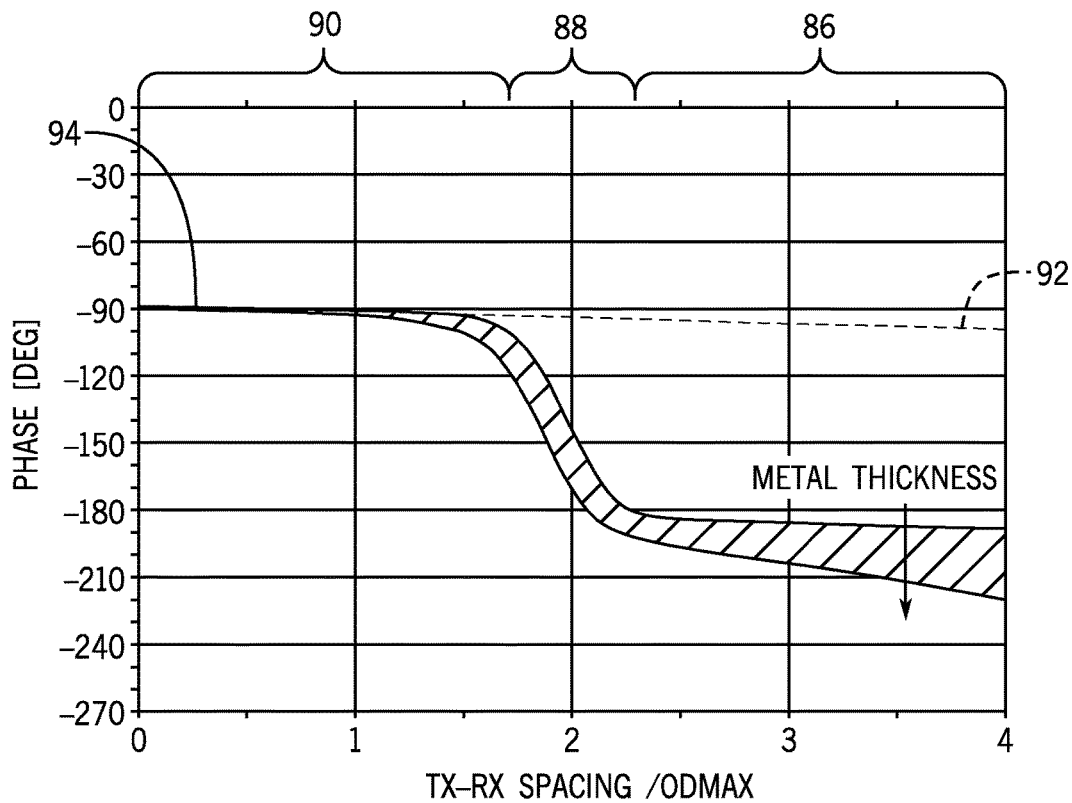
FIG. 4 is a plot illustrating phase changes attributed to tubular thickness and ratio of length of the spacing between the transmitter and receiver of the field testing probe of FIG. 1, in accordance with an embodiment.

However, these nearer zones—transition zone 88 and near field 90—may have different phase response behaviors than the far field (e.g., remote field). For example, FIG. 4 illustrates an embodiment of the phase responses of a direct field 92 inside the tubular 30 and an RFEC field 94 through the tubulars. As illustrated, as the phase response of the direct field 92 remains substantially linear in the near field zone 90, the transition zone 88, and the remote field zone 86. However, although the phase response of the RFEC field 94 is substantially linear in the near field zone 90 and the remote field zone 86, the phase response of the RFEC field 94 undergoes a substantially non-linear change until the RFEC field 94 enters the remote field 86, in which the phase response of the RFEC field 94 returns to substantially linear. Using a numerical model, the transition zone non-linearity may be accounted for and data from receivers in the transition zone 88 may be used to determine thickness of one or more innermost tubulars in addition to the overall thickness determined from receivers in the remote field zone.

Figure 5:
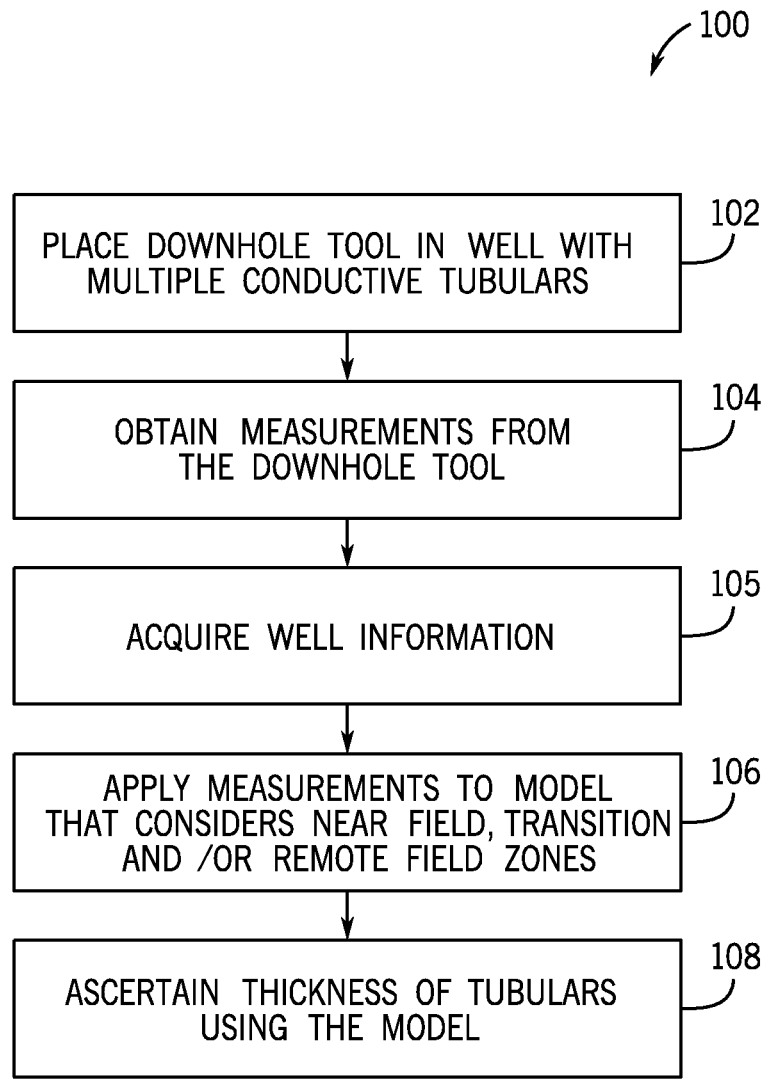
FIG. 5 is a flowchart that may be used to determine tubular thickness using the field testing probe of FIG. 1, in accordance with an embodiment.

For example, FIG. 5 illustrates a flowchart represents a process 100 that may be used to determine thickness of the tubulars 30, 34, and/or 38 using the logging tool 16. The process includes placing the logging tool 16 in a well with multiple conductive tubulars, such as tubulars 30, 34, and/or 38 (block 102). The logging tool 16 acquires measurements corresponding to total thickness for one or more of the tubulars 30, 34, and/or 38. The monitoring system 18 obtains the measurements from the logging tool 16 (block 104). In some embodiments, the monitoring system 18 obtains the measurements from the logging tool 16 as raw data. In other embodiments, the measurements are processed or pre-processed by the logging tool 16 before sending the data to the monitoring system 18. The model may incorporate other measurements such as from ultrasonic, caliper, other electromagnetic logging techniques to better constrain unknown parameters of the well tubing. Accordingly, in some embodiments, the monitoring system 18 and/or the logging tool 16 may acquire additional information about the well including a number of tubulars, nominal thicknesses of each tubular, centering of the tubulars, ultrasonic properties of the tubulars, ambient temperature, caliper measurements, or other parameters that may be useful in analyzing tubular thicknesses (block 105).

The monitoring system 18 applies the measurements to a model that considers the near field zone 90, the transition field zone 88, and/or remote field zone 86 (block 106). In some embodiments, the logging tool 16 may at least partially apply the measurements to the model. Using the model and the applied measurements and/or the additional information, the monitoring system 18 and/or the logging tool 16 ascertain thickness of the tubulars (block 108). The model may be any suitable mathematical description of a particular arrangement of tubulars. In some cases, several mathematical models may be compared to the measurements that have been obtained. The model that most closely matches the measurements may be selected. By determining which model the measurements most closely match, taking into account not just near field zone and far field zone data, but also data from the transition zone, more effective mathematical models may be used. The mathematical models may be determined from experimental measurements or computer modeling.

Minimizing the norm of the difference (e.g., least-squares minimization) between the observed data and data from numerical model yields the best fit parameters for the model of the tubulars. Various solution implementations, such as inversion, model searching, simulated annealing, or other suitable techniques, may be used to interpret the data. The choice of particular algorithm used relates to speed, complexity, and memory size for solving the minimization and may vary by implementation based on application specific choices.

In some embodiments, the monitoring system 18 and/or the logging tool 16 may determine metal loss in some of the metal tubulars as well as determining various properties of one or more tubulars (block 110). For example, additional information may derived or used by the monitoring system 18 and/or the logging tool 16 in determining metal thickness, such as thermal data, deviation survey results, caliper surveys of diameters, temperature, acoustic information, electromagnetic information (e.g., permeability and/or conductivity), or other suitable auxiliary information.

The magnetic field created by the transmitter 57 is not changed just by the distance between receiver and the transmitter. Field behavior is also changed by the conductive tubulars based at least in part on the thickness of the metal of the tubulars. For example, attenuation of the signal decreases as the tubular thickness increases.

Figure 6:
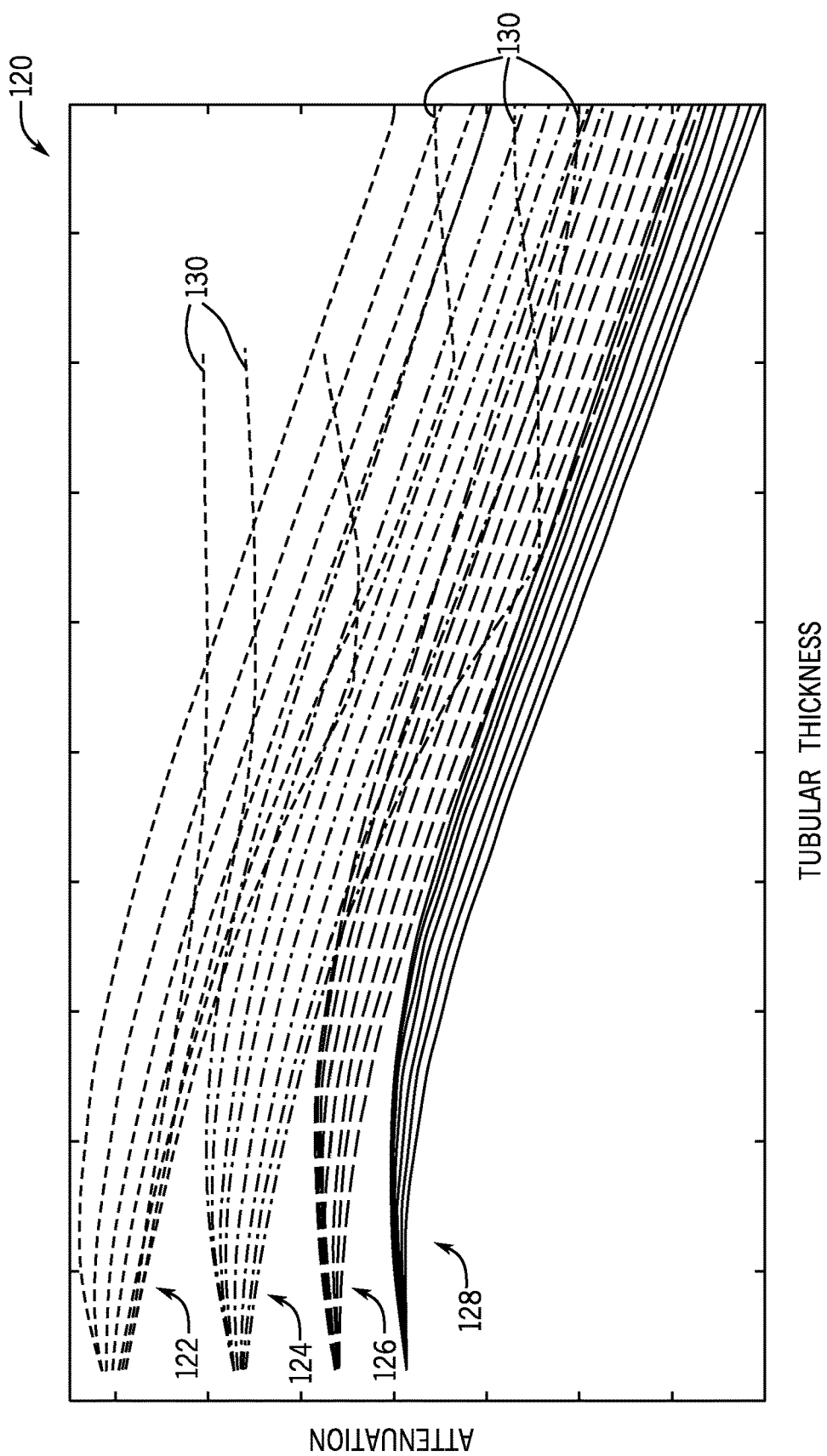
FIG. 6 is a plot illustrating signal attenuation and transition behavior attributed to tubular thickness and spacing, in accordance with an embodiment; (add box in figure)

FIG. 6 is a plot illustrating the challenges in FT operation for increased tubular thickness and sizes. Graph 120 shows attenuation of signals as thickness increases and attenuation based on tubular size. Group 122 illustrates results for different tubular sizes (e.g., 2.5, 5, 8, 11, 15, and 20 inch outer diameters) at a first receiver (e.g., receiver 66), and groups 124, 126, and 128 respectively illustrate results for different tubular sizes at a second, third, and fourth receivers (e.g., receivers 68, 70, and 72). Each plot in each of the groupings 122, 124, 126, and 128 respectively correspond to various tubular sizes (e.g., 2.5, 5, 8, 11, 15, 20, 25, and 30) for different receivers (e.g., receivers 66, 68, 70, and 72). As illustrated, non-RFEC responses 130 occur in some situations when the thickness of the tubulars exceeds a threshold that is based at least in part on tubular thickness, spacings between tubulars, and frequency and strength of the created field. In other words, non-RFEC responses may occur even when a general length between transmitters and receivers of the logging tool is selected to be more than three times an outside diameter of the total thickness of the tubulars 12. This separation principal for exhibiting remote field behavior is even more stringent when multiple tubulars are used.

Figure 7:
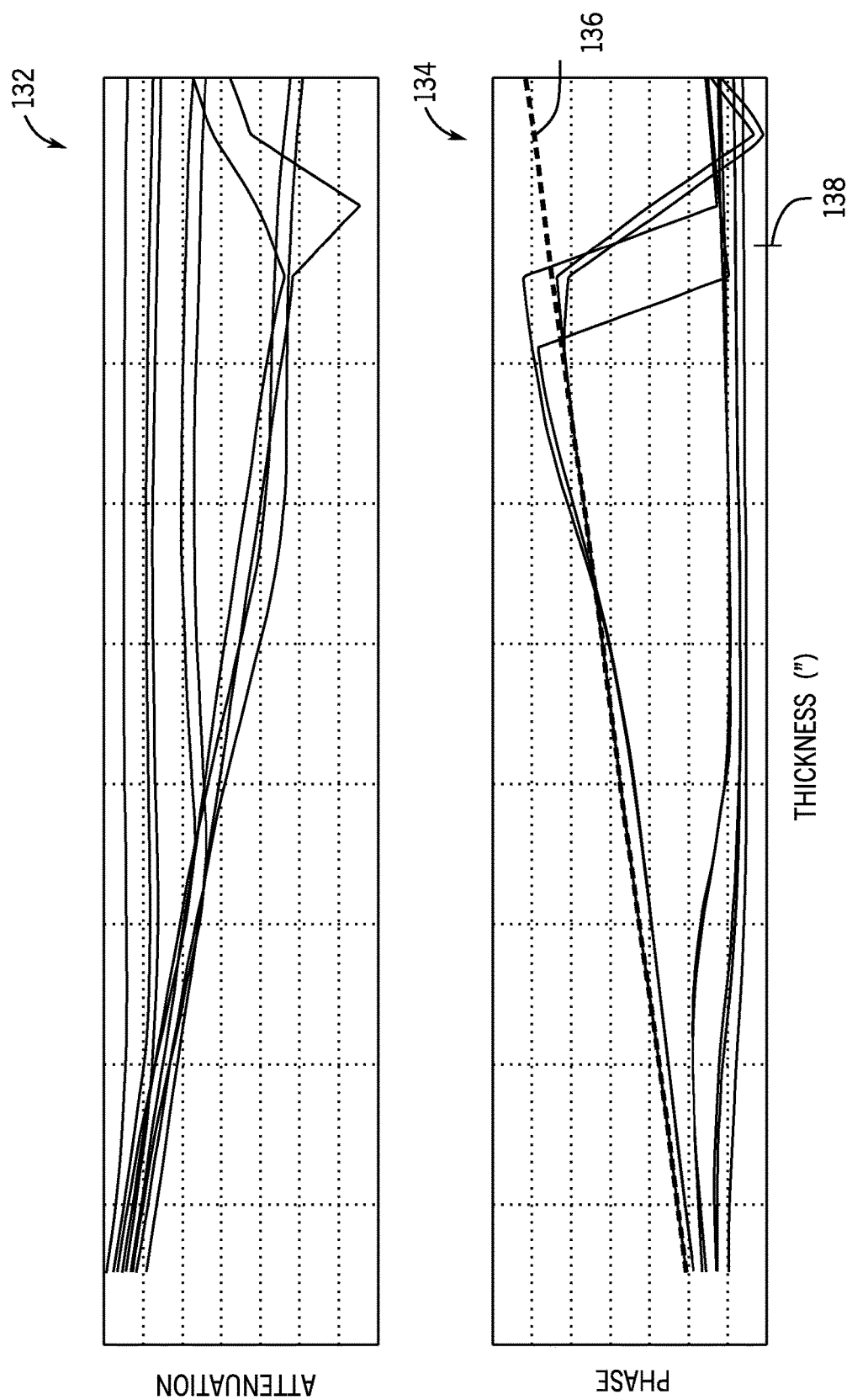
FIG. 7 is a plot illustrating field attenuation and phase shifting of the magnetic field due to at least two nested tubulars, in accordance with an embodiment.

For example, FIG. 7 illustrates plots 132 and 134 respectively illustrates field attenuation and phase shifting of the magnetic field due to at least two nested tubulars. In each of the plots 132 and 134, each transmitter and receiver is spaced at a distance at least twice the outer diameter of the tubulars. In the plot 134, the line 136 illustrates a single tubular model RFEC response. Each individual line illustrates a various sizes of the tubulars (e.g., 3" tubular nested inside of a 5" tubular). Note how each of the lines do not have the expected linear RFEC response (e.g., line 136) when the thickness of the tubulars has exceeded a threshold thickness 138. Instead, the lines indicate that the receivers are in the transition zone rather than the expected remote field 86. Furthermore, since many of the plotted lines fail to follow this linear phase RFEC response (e.g., line 136) versus thickness, placing the receiver at least twice the outside diameter from the transmitter may not be sufficient to predict linear field behavior (e.g., RFEC response). The full behavior of the fields may use accurate computation of the field zones to resolve the thickness from the impedance measurements.

Figure 8:
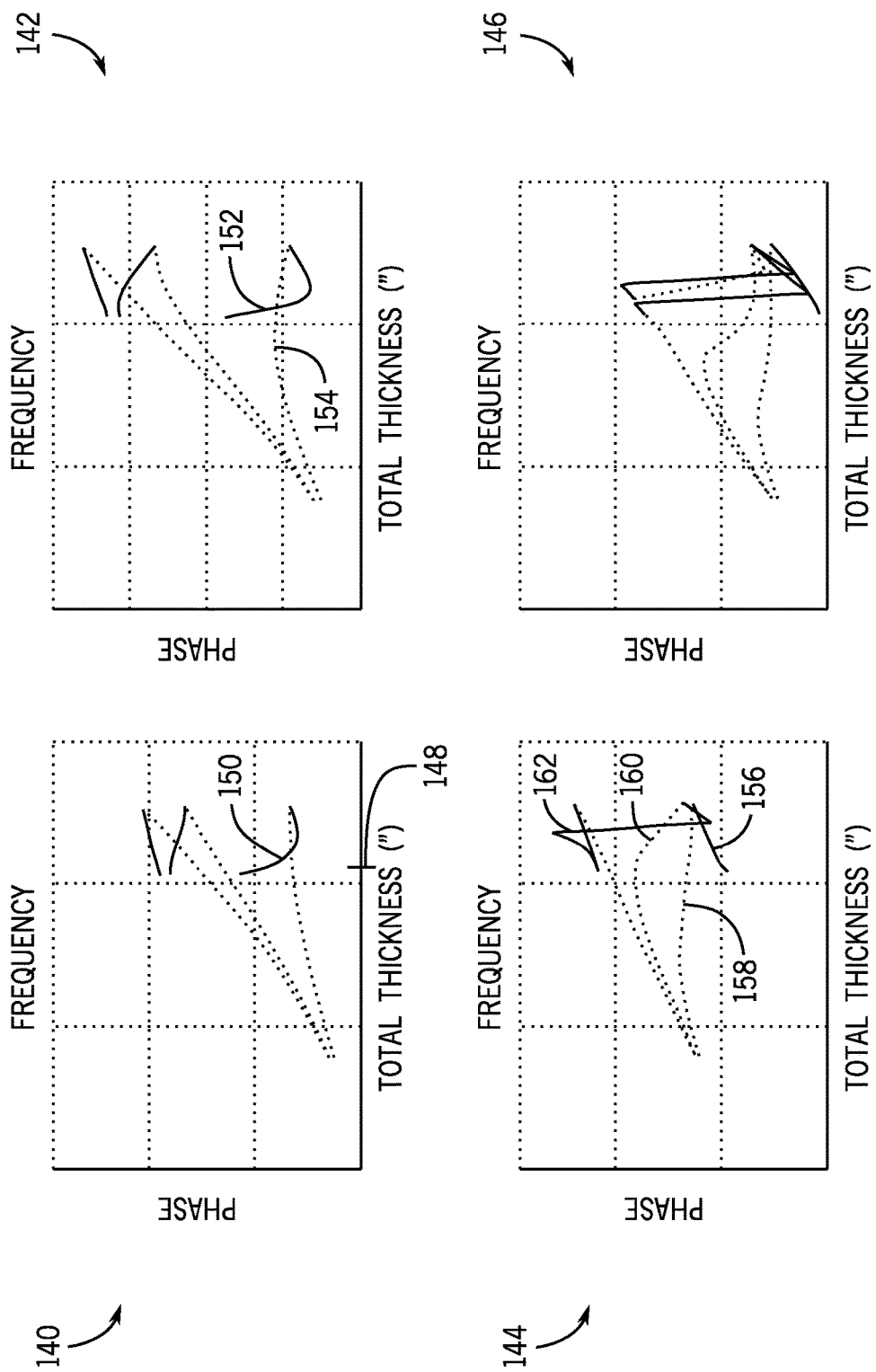
FIG. 8 is a graph illustrating impedance results for progressively higher-frequency AC signals creating fields at the transmitter of the logging tool of FIG. 1 for a double-tubular scenario, in accordance with an embodiment.

FIG. 8 illustrates plots 140, 142, 144, and 146 that each corresponds to impedance results for progressively higher frequency AC signals creating the fields at the transmitter for a one double-tubular scenario. In other words, the frequency of the created field increases from plot 140 to plot 142 and so forth. In some embodiments, the frequency of the field in plot 142 may be twice that of the frequency of the field used to create the plot 140, a half of the frequency of the field used to create the plot 144, and a quarter of the frequency of the field used to create the plot 148. The solid lines correspond to changes in thickness of the inner, nested tubular while maintaining thickness of the outer tubular. The dashed lines are for varying outer tubular thickness while maintaining inner tubular thickness. Each plot contains impedance measurements from three different receivers. As illustrated in plot 140, when the inner tubular is thicker than a thickness 148, a response 150 at a corresponding (e.g., closest) receiver appears to enter into the transition zone for that frequency while other responses remains substantially linear. In plot 142, lines 152 and 154 also appear to indicate that the closest receiver is in the transition zone while remaining lines appear to substantially linear at the second frequency. However, for the middle spacing the phase decreases with increasing thickness of the inner tubing which is opposite behavior to the RFEC behavior of phase increasing with increasing metal thickness. In plot 144, lines 156, 158, 160, and 162 appear to indicate that the corresponding receivers (e.g., closest two receivers) are in the transition zone for the third frequency. In the plot 146, each of the lines appears to break down at the highest frequency. In other words, higher frequencies may enter a transition zone at smaller thicknesses than lower frequencies. Thus, frequency response of various frequencies may be used to aid in identification of metal thickness by determining whether a receiver is in a near field zone, transition zone, or a remote field zone.

Figure 9:
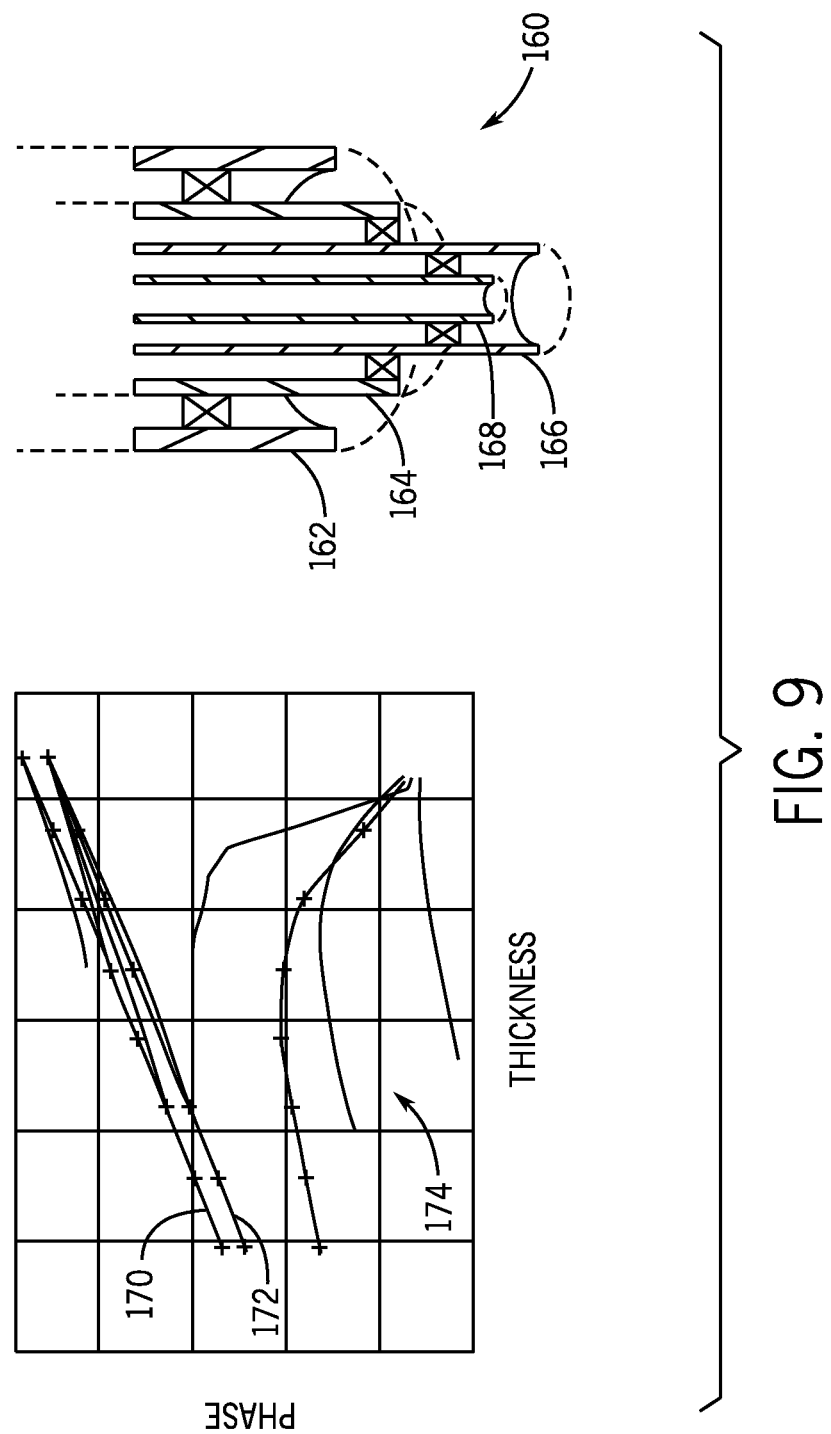
FIG. 9 illustrates nested tubulars and the effects of thickness changes for each of the nested tubulars on phase of a field generated by the logging tool of FIG. 1, in accordance with an embodiment.

In addition to different frequency responses, different spacings of the receivers may be used to more robustly identify changes in tubular thickness. FIG. 9 illustrates a nested tubular 160 that includes tubulars 162, 164, 166, and 168. When the tubulars 162, 164, and 166 are held at a constant thickness while tubular 168 varies, the plots 170, 172, and 174 reflect phase responses at respective receivers 70, 68, and 66. As illustrated, the plots 170 and 172 reflect RFEC behavior. Therefore, the receivers 68 and 70 are in the remote field zone 86. However, the plot 174 indicates that the receiver 66 is the transition zone 88. Furthermore, although the receiver 66 is in the transition zone 88, the plot 174 reflects changes to a single innermost tubular—the tubular 174. The other sets of line types are for varying the thickness of each of the other tubular thickness e.g., tubulars 168, 164, and 162) and the grouping representing which receiver separation is used to measure the response.

With the foregoing in mind, multi-frequency and multi-spacing measurements provide rich complex descriptions of the response in response to thickness changes of each tubular which provides additional information to better resolve individual changes in thickness in the interpretation. In other words, the plots illustrate that having multiple spacing measurements and accurate modeling enables a more accurate interpretation of the measurement.

In some embodiments, a robust model may be used to solve simplified situations by assuming values for one or more independent parameters and solving just desired parameters. For example, the electromagnetic properties of tubulars are independent parameters. The measured attenuation and phase shift depend on the skin depth ($\delta$) in the tubular metal $\delta=\sqrt{2/(\mu\sigma\omega)}$ where $\mu$ and $\sigma$ are the permeability and conductivity of the tubular and ($\omega=2\pi f$), where f is the measurement frequency. By assuming values for permeability and conductivity for each of the tubulars, the determination is simplified.

In some embodiments, this simplified tubular determination may be used to determine two parameters—thickness of the innermost tubular and the overall thickness for the tubulars—rather than numerous other parameters. In some embodiments, if the results are consistently unexpected, assumed parameters may be verified and/or changed. Using the assumed parameters, data relating to the normalized impedances is recorded from variously spaced receivers at one or more frequencies. Minimizing the 'norm' of the difference (e.g., least-squares minimization) between the observed data and data from numerical model yields the best fit parameters for the model of the tubulars. Various solution implementations, such as inversion, model searching, simulated annealing, or other suitable techniques, may be used to interpret the data. The choice of algorithm relates to speed, complexity, and memory size for solving the minimization and may vary by implementation based on application specific choices.

In some embodiments, error may be reduced when the receivers are located in the near, far and remote field zones. Multiple-spaced receiver coils providing measurements at one or several frequencies provide sufficient extra information to solve for a more complex model (as discussed below) than a simple overall thickness. The transmitter-receiver separation for the outermost receiver may be in the remote field, and the other receivers are spaced such that a spacing/frequency combination puts some of the response into the near field zone, the transition zone, and/or the far field zone. In some embodiments, job-specific tool geometries may be designed for a specific tubular geometry.

Numerical Model Implementation

Figure 10:
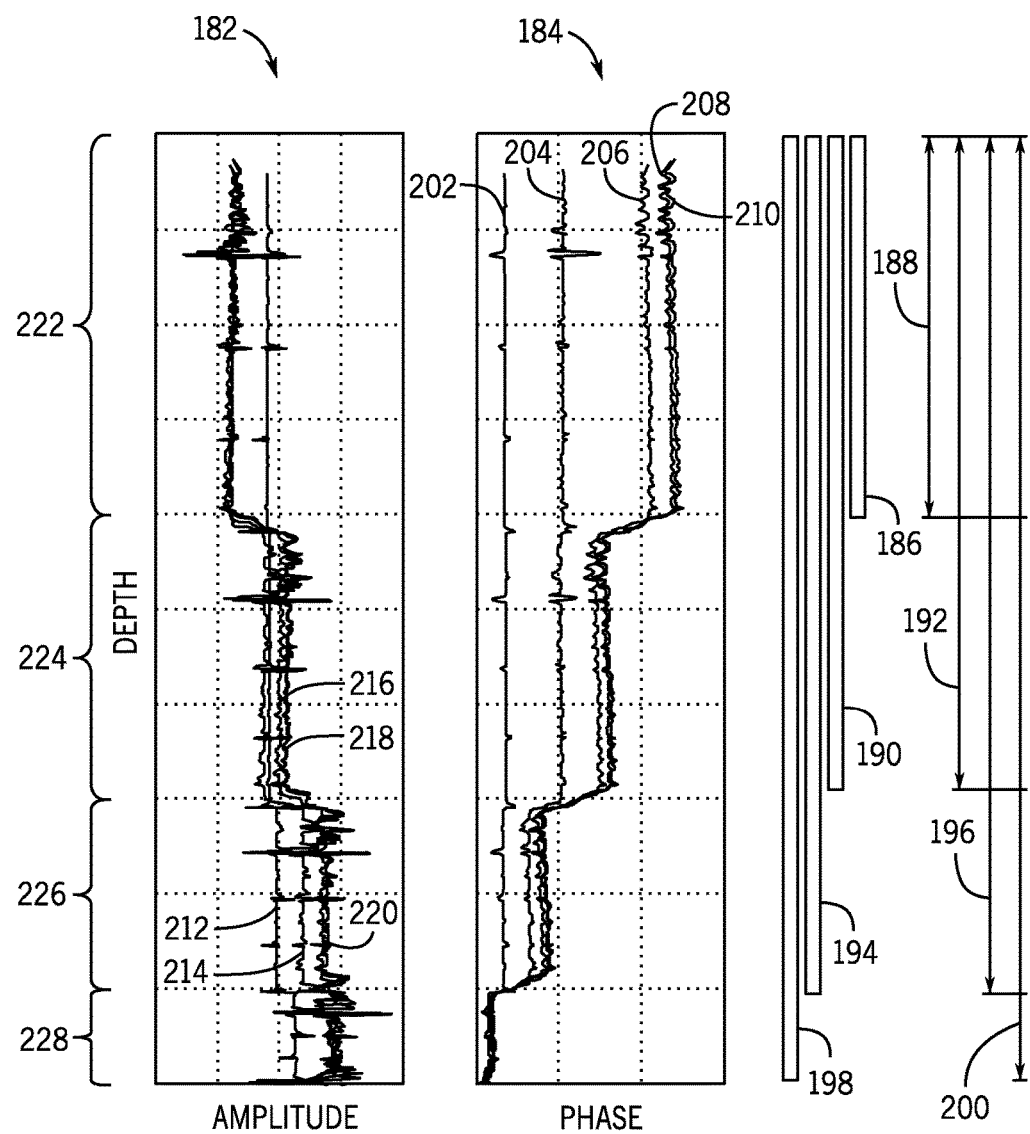
FIG. 10 illustrates a simulated data log of the logging tool of FIG. 1 that passes through nested tubulars where the data log has multiple zones, in accordance with an embodiment.

FIG. 10 illustrates a simulated data log 180 of the logging tool 16 that passes through an embodiment of nested tubulars. Plot 182 corresponds to amplitude changes as the logging tool 16 traverses the nested tubulars. Similarly, plot 184 illustrates a phase change response at a single frequency as the logging tool 16 traverses the nested tubulars. The tubulars include 4 nested tubulars of various depths. A first model tubular 186 extends to a first depth 188, a second model tubular 190 extends to a second depth 192, a third model tubular 194 extends to a third depth 196, and a fourth model tubular 198 extends to a fourth depth 200.

In the illustrated embodiment, each plot includes responses from multiple receivers. For example, plot 184 includes responses 202, 204, 206, 208, and 210 are received at five receivers each located further from the transmitter 57. Similarly, the plot 182 includes responses 212, 214, 216, 218, and 220 from the same respective receivers.

The depth of the model well used to generate the plots 182 and 184 may be divided into 4 zones 222, 224, 226, and 228, each corresponding to which tubulars of the model are present. For example, zone 222 includes four tubulars 186, 190, 194, and 198. Zone 224 includes three tubulars 190, 194, and 198. Zone 226 includes two tubulars 194 and 198. Zone 228 includes a single model tubular 198. In zones 222, 224, 226, and 228, the response 202 may correspond to a thickness of the inner model tubular 198. In zones 222, 224, and 226, response 204 may correspond to a thickness of the two inner tubulars 198 and 194. In zones 222 and 224, response 206 may correspond to a thickness of the three inner tubulars 198, 194, and 190. In each of the zones, responses 208 and 210 may correspond to overall thickness. As seen from the plots 182 and 184, using a known depth of the tubulars, a nominal thickness of each tubular, and a nominal diameter of each tubular, a thickness and loss may be determined for each tubular individually. For example, a loss of material may be determined for the overall thickness by the following equation:

$$\text{loss}_T = \text{Thickness}_{T\_Nom} - \text{Thickness}_{T\_Measured} \quad \text{(Equation 1)},$$

where $\text{loss}_T$ is the total material lost each of the tubulars, $\text{Thickness}_{T\_Nom}$ is a nominal thickness, and $\text{Thickness}_{T\_measured}$ is actual thickness measured. Since the plots 182 and 184 have responses that correspond to thicknesses of a sum of the thicknesses of each of the tubulars with any tubulars nested therein, a loss for each tubular may be defined using the following equation:

$$\text{loss}_n = \text{loss}_T \Sigma_{i=1}^{i=n-1} \text{loss}_i \quad \text{(Equation 2)}$$

where $\text{loss}_n$ is the loss of a tubular when the tubulars are numbered starting at 1 and incremented for each tubular.

Figure 11:
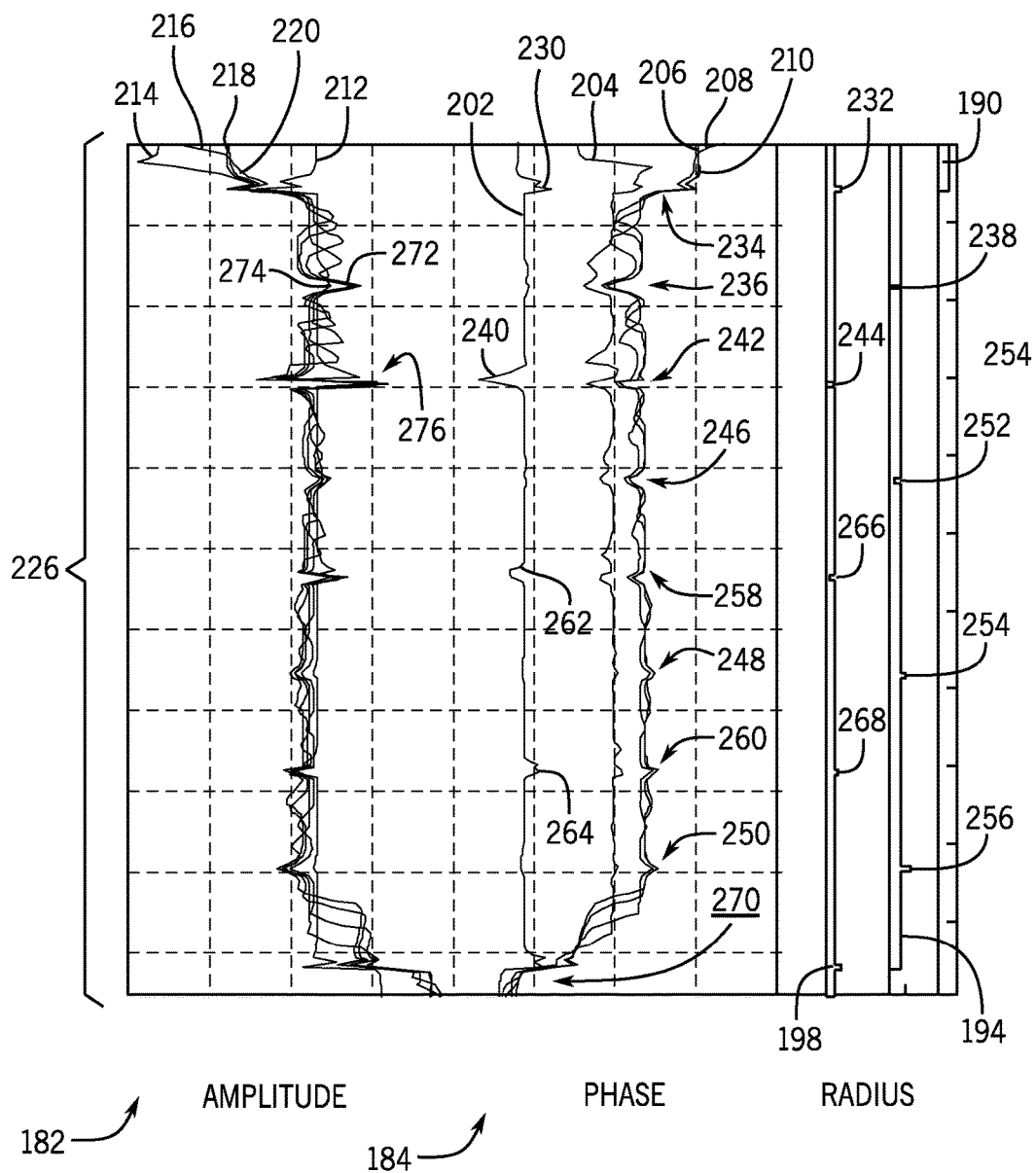
FIG. 11 is a plot illustrating a zoomed view of one of the multiple zones of FIG. 10, in accordance with an embodiment.

FIG. 11 is a zoomed in view of the plot 182 and 184 in the zone 226. At point 230 on response 202, an increase in phase indicates that the thickness of model tubular 198 has increased similar to the indication 232. When the model tubular 198 thickness increased, the total thickness of the tubulars 190, 194, and 198 also increases as indicated by point 234 in responses 204, 206, 208, and 210. The additional model tubular 190 is not present above point 230 in curve 202. However, curves 206, 208 and 210 increase. At point 236, the thickness of the tubulars 194 decreases without any substantial change in the response 202. However this defect causes a strong phase response for 206, 208 and 210 and detected in response 204, as well. Accordingly, the thickness change may be attributed to model tubular 194, as reflected the model tubular 194 by the indication 238 of material loss is associated with model tubular 194. At points 240 and 242, each of the responses indicates a thickness decrease. Since point 240 indicates a decrease in thickness of the model tubular 198, at least part of the decrease in thickness may be attributed to the model tubular 198 as shown by the loss indication 244 on the model tubulars. At points 246, 248, and 250, responses 204, 206, 208, and 210 indicate a thickness change without a substantial change in the thickness indicated by response 202. Accordingly, such changes may be attributed to the model tubular 194 by the indications 252, 254, and 254 on the model tubulars. On the other hand, points 258 and 260 have corresponding changes in the response 202 at points 262 and 264. Accordingly, at least a portion of the thickness changes at these points may be attributed to the model tubular 198, as shown by the indications 266 and 268.

At point 270, just a single tubular is present. Therefore, any thickness changes may be attributed to the model tubular 198. Although the foregoing discussion pertains to evaluations in the phase domain, similar analysis may be performed in the amplitude domain of plot 182. For example, point 272 indicates an amplitude increase corresponding to a thickness decrease. However, point 274 indicates that the change occurs at least primarily outside of the model tubular 198. Accordingly, the thickness decrease may be attributed to the model tubular 198. Similarly, when a change occurs in each of the responses, such as point 276, the thickness change may be attributed at least partially to the innermost tubular (e.g., model tubular 198). Furthermore, although the foregoing discusses deriving data from known tubulars using tubular model information, in some embodiments, properties about physical tubulars may be derived in a like manner.

Figure 12:
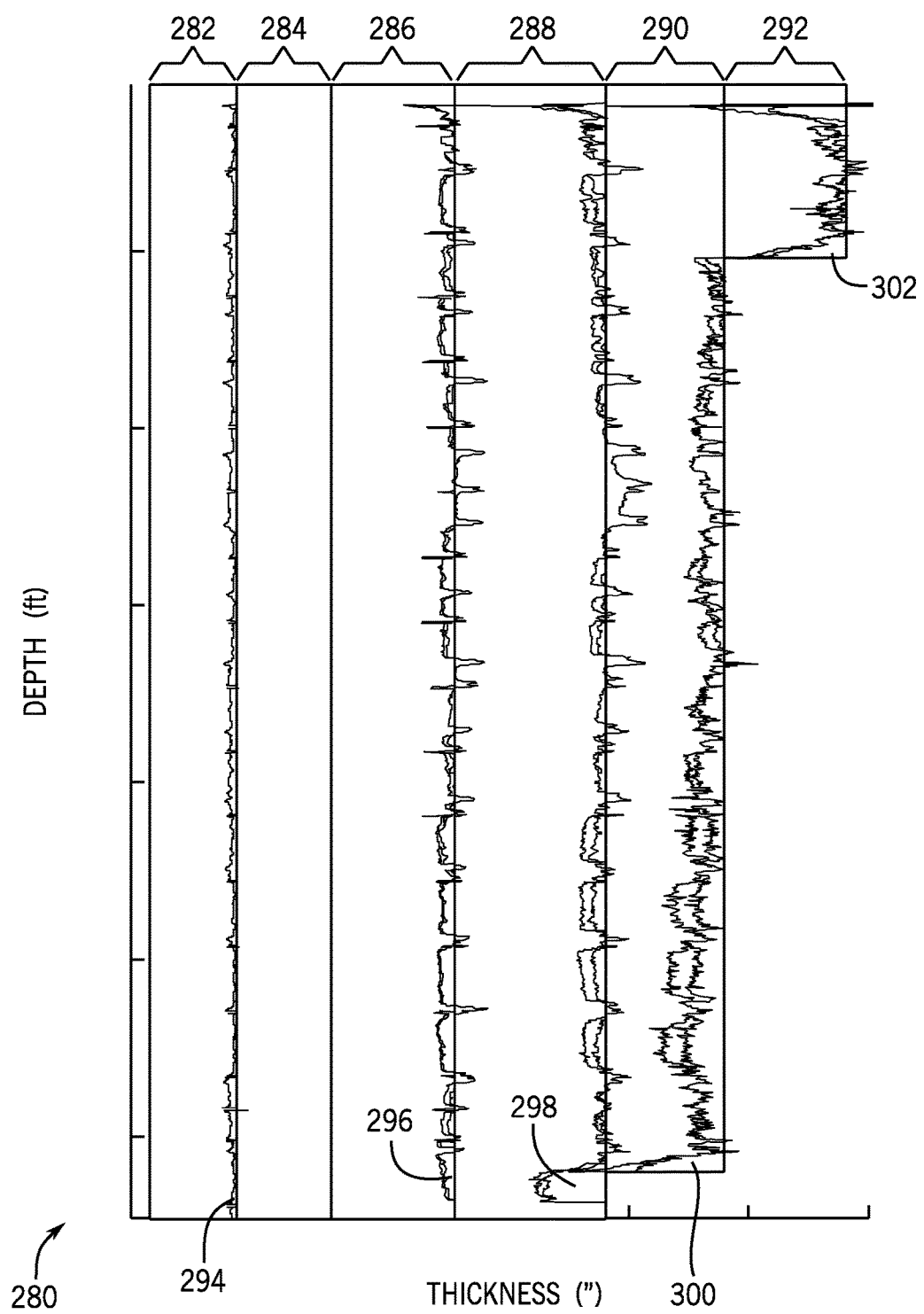
FIG. 12 illustrates a combination of data acquired using one or more fields of different frequencies and receiver spacings in a single plot, in accordance with an embodiment.

In some embodiments, a single plot may not be feasible for each tubular using current equipment. Instead, some receivers may correspond to one or more tubulars. For example, FIG. 12 illustrates an embodiment of a combination of data into a plot 280 acquired using one or more fields of different frequencies and receiver spacings. The plot 280 is divided into six zones 282, 284, 286, 288, 290, and 292 reflecting different radii from the center of six nested tubulars. The plot 280 corresponds to the six nested tubulars with the innermost tubular corresponding to the zone 282 and each zone to the right of zone 282 corresponding to progressively larger nested tubulars. Each loss plot 294, 296, 298, and 300 corresponds to a material loss of one or more tubulars. Specifically, the black plot corresponds to loss of material on the one or more tubulars of the zone while the gray plot portion of each plot corresponds to overall loss of material of in the tubulars inside of the tubular. In other words, the black and gray plot combination includes material of a tubular and each of the tubulars within the tubular. Thus, by constructing the loss at each level using the equation 2. The loss of material, which may also be referred to generally as metal loss, may be determined for the innermost tubular by the plot 294 while metal loss for the second and third tubulars may be determined using the plot 286; metal loss for the fourth tubular may be determined using the plot 288; metal loss for the fifth tubular may be determined using the plot 290 below depth 302; and metal loss for the fifth and sixth tubulars may be determined using the plot 292 above the depth 302.

Figure 13:
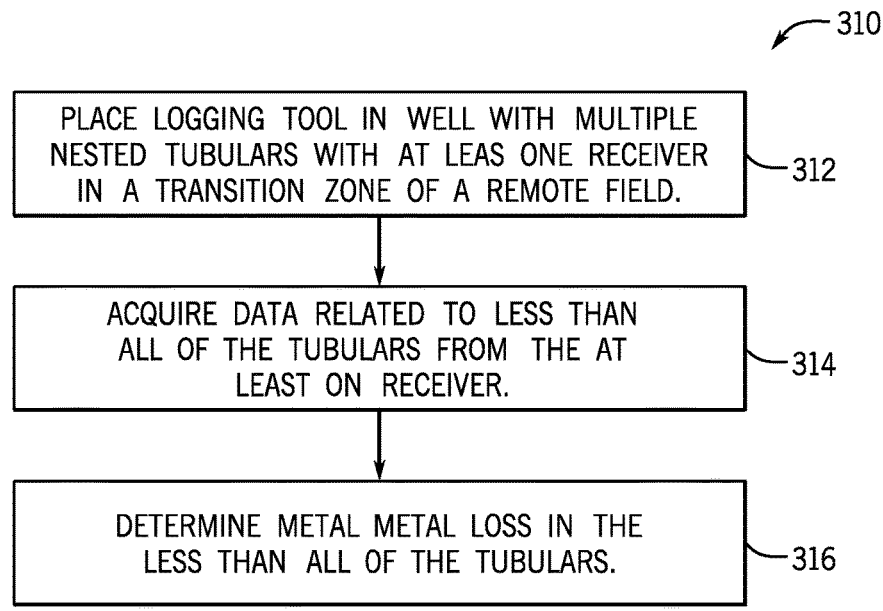
FIG. 13 illustrates a process for determining tubular thickness in one or more nested tubulars, in accordance with an embodiment.

FIG. 13 illustrates a process 310 for determining tubular thickness in one or more nested tubulars. The process 310 includes placing a logging tool 16 in a well with multiple nested tubulars with at least one receiver of the logging tool 16 placed in a transition zone of a remote field (block 312). The at least one receiver in the transition zone acquires data alongside data acquired from receivers in the remote field zone where the transition zone data pertains to less than the total number of the tubulars (block 314). For example, the transition zone data may pertain to a single inner tubular or two or more inner tubulars when more (e.g., four) tubulars are nested within the well. Based on the transition zone data determine metal loss of the less than the total number of tubulars (block 316). For example, use the plot 294 to determine metal loss for an innermost tubular. Furthermore, when using more than one receiver in the transition, other tubular or tubular group losses may be determined by applying Equation 2 to measurements of the receivers in the transition zone each corresponding to one or more tubulars.

Thus, using model based discrimination to identify the corrosion zones provides additional valuable information for assessing well conditions and planning repair operations as compared to having just an overall metal loss. This additional information may allow time-lapse monitoring of internal corrosion of the tubing versus the outermost casing for example—to better plan remediation work and well maintenance operations.

Multiple Frequencies

As previously discussed, frequency variation and receiver spacing may place receivers of the logging tool in the transition zone. In certain embodiments, a single frequency may be used in each pass of the logging tool 16. However, some embodiments, may obtain data at multiple frequencies simultaneously transmitting a rich set of transmitter frequencies in the original transmitter waveform. For example, the waveform may include a 1.1 Hz signal with multiple harmonics, such as 2.2 Hz, 3.3. Hz, and/or other harmonics. In some embodiments, the transmitter waveform could be dynamically changed to illuminate the desired regions, thus saving measurement time in the field by reducing the number of logging passes. In other words, by transmitting multiple frequencies concurrently some of the receivers may be in transition zone for at least one frequency but in a far field the remaining frequencies. Thus, a single multi-frequency pass may be used to increase efficiency while providing a rich set of data points indicating thickness information about many of the nested tubulars individually or in subsets of the overall thickness to enable differentiation of thickness variations between individual tubulars or groups of tubulars.

Using Different Measurement Types

Figure 14:
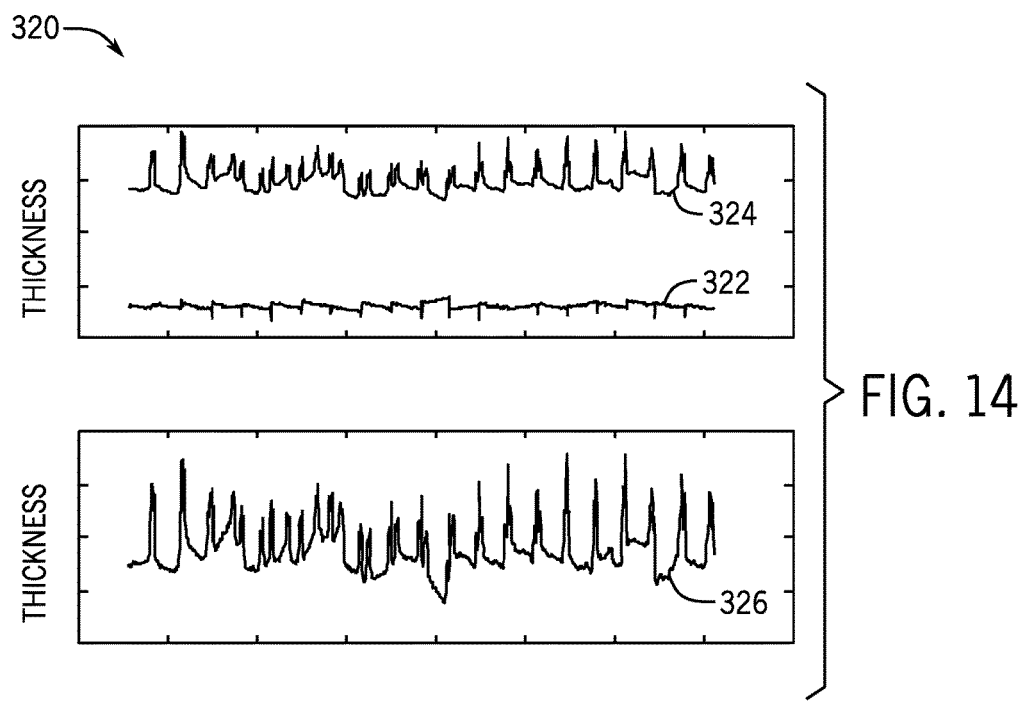
FIG. 14 illustrates a graph that includes a first measurement acquired using a first technology that indicates a thickness of an innermost tubular of nested tubulars and a second measurement acquired using a second technology that indicates a overall thickness of the nested tubulars, in accordance with an embodiment.

Log measurements may be acquired using two or more measurement types. For example, in some embodiments, an innermost tubular thickness may be determined using a first technology (e.g., acoustic measurements) while overall thickness of the nested tubulars may use a second technology (e.g., electromagnetic measurements). FIG. 14 illustrates a graph 320 that includes a first measurement 322 acquired using a first technology (e.g., ultrasonic) that indicates a thickness of an innermost tubular. The graph 320 also includes a second measurement 324 that is acquired using a second technology (e.g., RFEC in remote field, eddy current, or flux leakage). By deriving thickness information using two different technologies, a more robust determination of tubular thickness may be performed. Using the two technologies, thickness changes detected by the first technology may be attributed to the innermost tubular while changes not detected by the first technology may be attributed to the remaining tubulars other than the innermost tubular. Thus, by subtracting the innermost tubular thickness of first measurement 322 from the second measurement 324, a derived thickness 326 of tubulars other than the innermost tubular may be determined. For example, if just two tubulars are nested, the derived thickness of the remaining tubulars determined by subtracting a thickness of the innermost tubular from an overall thickness would correspond to the thickness of the outermost tubular, or enable measurement of changes in the electromagnetic properties of the innermost tubing. Using one or more of the technologies, some embodiments may determine various properties about the tubulars in addition to thickness. For example, some embodiments of the monitoring system 18 and/or the logging tool 16 may determine electromagnetic properties of the tubulars, such as conductivity or permeability. This information may be used for various properties. For example, permeability may be used to determine strain that has modified permeability of the tubulars. For example, such measurements may be used to determining where casings or drill strings are stuck in the tubulars.

Tool Centering and Tilt

Figure 15:
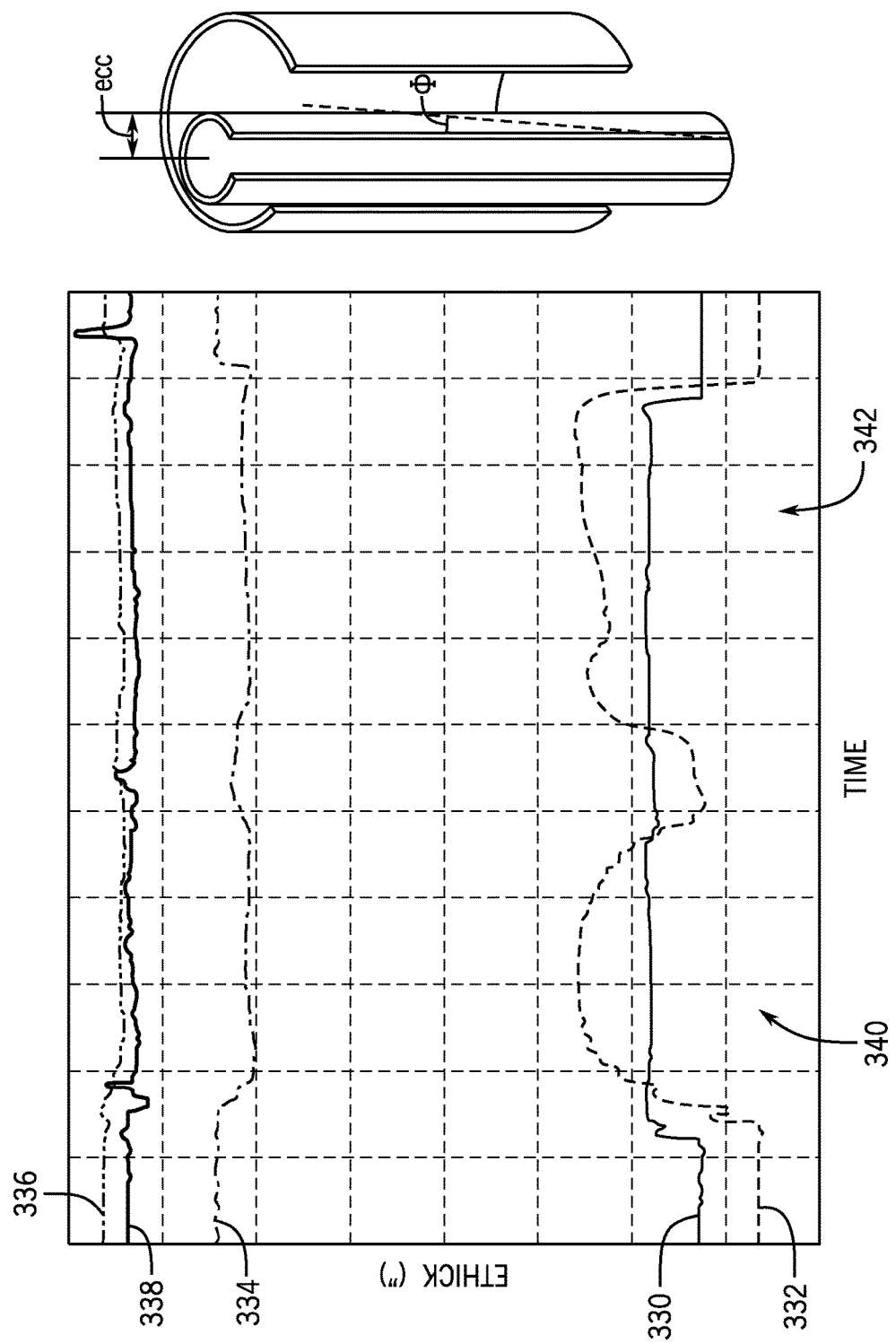
FIG. 15 shows thickness measurements obtained during tilt and eccentering of the logging tool of FIG. 1 within nested tubulars, in accordance with an embodiment.

Further accuracy may be calculated by allowing the model parameters to include the effects of the casings or the tool being off-center. 3-D finite element and finite-dimensional codes may be used to handle the added complexity, which would then allow the interpretation to include the eccentering or alignment angle ($\phi$) of each tubular. For example, FIG. 15 shows thickness measurements 330, 332, 334, 336, and 338 from five receivers referenced from closest to a transmitter of the logging tool 16 to furthest. In other words, measurement 330 is acquired at the closest receiver to the transmitter. Note that the longest-spaced receivers from the transmitter (e.g., measurements 336 and 338) in the RFEC do not appear to be substantially changed during eccentering and tilt effects. However, for the receivers closest to the transmitter, there is apparent thickness changes to the inside casing. However this 'apparent metal loss' will be not seen in the outside spacing so additional heuristic knowledge can also be added to the model interpretation to separate eccentering from corrosion effects. Since true thickness changes would be detected by the longest-spaced receivers and the closest receivers, when a close receiver detects a change that is not correspondingly detected by the longest-spaced receivers, the thickness change may be attributed to tool eccentering or tilt. More accurate interpretation maybe possible using full 3 dimensional modeling of the tool and casing geometries including centering and azimuthal information.

In other words, when at least one of the receivers are in the transition zone and detects a change in thickness, but the RFEC receivers at far distances do not detect a change; the change may be attributed to eccentering and/or tilt. For example, region 340 illustrates an eccentered measurement because no effect is measured at the RFEC receivers (e.g., measurements 336 and 338). Similarly, region 342 illustrates an eccentered measurement with tilt of the tool because no effect is measured at the RFEC receivers. Differentiation between tool or tubular eccentering and tool tilt may be made by overall shape of the changes detected by the closest receivers. Specifically, a substantially symmetrical curve or spike in thickness measurements may indicate that the tool or a tubular is eccentered within the nested tubulars. However, if a generally linear measurement change occurs over a period of time (e.g., region 342), the logging tool 16 may be tilted within the tubulars in addition to the eccentering of the tubular or the logging tool 16. If actual loss occurred at the innermost tubular, the RFEC receivers would detect overall thickness loss in the tubulars. If loss occurred on the outermost tubular, no change might not be detected at the close receivers (e.g., measurements 330 and 332) while detected at the RFEC receivers. Thus, when interpreting thickness measurements, changes detected just by the closest receivers may be attributed to the eccentering or tilt of the logging tool thereby increasing thickness measurements and accuracy in a robust and useful way.

The specific embodiments described above have been shown by way of example, and it should be understood that these embodiments may be susceptible to various modifications and alternative forms. It should be further understood that the claims are not intended to be limited to the particular forms disclosed, but rather to cover modifications, equivalents, and alternatives falling within the spirit and scope of this disclosure.

What is claimed is:

1. A method for determining thickness of a plurality of nested tubulars comprising:
   placing a logging tool in a well with the plurality of conductive tubulars;
   generating an electromagnetic field using a transmitter of the logging tool, wherein the electromagnetic field interacts with the plurality of conductive tubulars;
   obtaining measurements of the electromagnetic field from one or more receivers of the logging tool, wherein the one or more receivers are located away from the transmitter, wherein the one or more receivers are located in a transition zone of the electromagnetic field, and wherein the one or more receivers are situated so that it or they receives the measurements in the transition zone of the electromagnetic field;
   applying the measurements to a model that considers at least the transition zone and one or both of a near field zone and a remote field zone of the electromagnetic field that interacts with the plurality of conductive tubulars;
   ascertaining a thickness of a subset of the conductive tubulars using the model based at least in part on the measurements in the transition zone, wherein a total number of tubulars in the subset is less than a total number of the plurality of nested tubulars; and
   determining metal loss in the subset of nested tubulars using the one or more electromagnetic measurements.

2. The method of claim 1, wherein the measurements are obtained from a plurality of the receivers of the logging tool.

3. The method of claim 1, wherein the subset comprises a single innermost tubular of the plurality of tubulars.

4. The method of claim 1, wherein the subset comprises two or more inner tubulars of the plurality of tubulars.

5. The method of claim 1, comprising modifying a frequency used to create the field to place the electromagnetic field that is being measured by the receiver in the transition zone.

6. The method of claim 1, wherein the model predicts attenuation or phase of the measured electromagnetic field as a function of thickness, wherein the phase or attenuation is non-linear when the measured electromagnetic field is measured in the transition zone.

7. A method for determining thickness of a plurality of nested conductive tubulars comprising:
   placing a logging tool in a well having the plurality of nested conductive tubulars;
   acquiring one or more electromagnetic measurements by generating an electromagnetic field using a transmitter of the logging tool and detecting the electromagnetic measurements using a receiver of the logging tool located in a transition zone of the electromagnetic field that detects the electromagnetic measurements in the transition zone of the electromagnetic field, wherein the receiver is located away from the transmitter, wherein the electromagnetic measurements are indicative of a thickness of a subset of nested tubulars, wherein a total number of tubulars in the subset is less than a total number of the plurality of nested tubulars; and determining metal loss in the subset of nested tubulars using the one or more electromagnetic measurements.

8. The method of claim 7, wherein acquiring the electromagnetic measurements comprises acquiring the electromagnetic measurements by generating the electromagnetic field in the transmitter using different frequencies, thereby causing the electromagnetic measurements to be detectable by a receiver spaced apart from the transmitter, wherein at least one of the frequencies is configured to place the electromagnetic measurements detected by the receiver in the transition zone.

9. The method of claim 8, comprising passing the logging tool through the well multiple times, wherein during each pass the transmitter of the logging tool generates the electromagnetic field at a different frequency.

10. The method of claim 8, comprising passing the logging tool through the well while using the transmitter of the logging tool to generate the electromagnetic field using multiple frequencies concurrently.

11. The method of claim 7, comprising:
acquiring one or more additional electromagnetic measurements using the logging tool, wherein the one or more additional electromagnetic measurements indicative of an overall thickness of the plurality of nested tubulars; and
determining a total metal loss in the plurality of nested tubulars.

12. The method of claim 11, comprising determining that thickness changes occur in the subset of nested tubulars or to the remaining tubulars of the plurality of nested tubulars other than the tubulars of the subset.

13. The method of claim 12, comprising determining that thickness changes reflected in both the data indicative of the thickness of the subset of nested tubulars and the data indicative of the overall thickness indicates that the thickness changes occur in the subset of nested tubulars.

14. The method of claim 12, comprising determining that thickness changes reflected just in the data indicative of overall thickness and not in the data indicative of the thickness of the subset indicates that the thickness changes occur in the remaining tubulars other than the tubulars of the subset.

15. The method of claim 14 comprising determining that thickness changes reflected just in the data indicative of the thickness of the subset and not in the data indicative of the overall thickness indicates that the thickness changes may be attributed to logging tool eccentering or tilt.

* * * * *